United States Patent

Shigemi et al.

[11] Patent Number: 5,351,778
[45] Date of Patent: Oct. 4, 1994

[54] AUTOMOTIVE WORKING MACHINE OF RADIO CONTROL TYPE

[75] Inventors: Mori Shigemi; Akagi Hitoshi, both of Okayama, Japan

[73] Assignee: Kaaz Corporation, Okayama, Japan

[21] Appl. No.: 936,938

[22] Filed: Aug. 28, 1992

[30] Foreign Application Priority Data

| Aug. 30, 1991 | [JP] | Japan | 3-246762 |
| Apr. 18, 1992 | [JP] | Japan | 4-024868 |
| Apr. 28, 1992 | [JP] | Japan | 4-028369 |

[51] Int. Cl.$^5$ .......................... B62D 1/24; B60K 41/24
[52] U.S. Cl. .................. 180/167; 192/0.094; 56/10.2 A
[58] Field of Search ............ 180/167; 192/1.44, 17 R, 192/17 C, 0.094; 56/11.3, 10.8, 10.2 A, DIG. 7, DIG. 15

[56] References Cited

U.S. PATENT DOCUMENTS

| 3,472,333 | 10/1969 | Loewenstein, Jr. | 180/167 |
| 3,800,902 | 4/1974 | Keller | 180/167 |
| 4,290,512 | 9/1981 | Zindler | 192/17 R |
| 4,306,329 | 12/1981 | Yokoi | 180/167 X |
| 4,513,469 | 4/1985 | Godfrey et al. | 180/167 X |
| 4,533,998 | 8/1985 | Falamak | 180/168 X |
| 4,671,376 | 6/1987 | Ito et al. | 180/249 |
| 4,671,395 | 6/1987 | Dobberpuhl et al. | 192/17 C |
| 4,878,050 | 10/1989 | Kelley | 180/167 X |
| 4,964,265 | 10/1990 | Young | 56/10.8 |
| 5,000,302 | 3/1991 | Takeshita | 192/17 R |
| 5,155,985 | 10/1992 | Oshima et al. | 56/11.3 X |
| 5,174,405 | 12/1992 | Carra et al. | 180/9.32 |
| 5,242,039 | 9/1993 | Mabee | 192/0.094 X |

*Primary Examiner*—Karin L. Tyson
*Assistant Examiner*—Florian Zeender
*Attorney, Agent, or Firm*—Koda and Androlia

[57] ABSTRACT

The invention suggests an unmanned radio-control automotive working machine for safely mowing grass and lawns on dangerous slopes, which includes a carriage on which a power source such as a gasoline engine, a traveling apparatus and a working apparatus of a grass cutter, a lawn mowing blade or the like and, more particularly, the structure of a traveling transmission mechanism of a traveling control apparatus in which a traveling brake functions without fail when a traveling clutch is neutral, and a differential-gear lock and the brake function to effect the braking operation quickly even if the working machine is on a steep slope, and the structure of a brake apparatus installed in a gear case of the traveling transmission. Thus, the invention achieves safety in radio-control operation, and size and weight reduction of the working machine.

4 Claims, 10 Drawing Sheets

AUTOMOTIVE WORKING MACHINE OF RADIO CONTROL TYPE

BACKGROUND OF THE INVENTION

1. Industrial Field of the Invention

The present invention relates to a radio-control automotive working machine and, more particularly, to a traveling control apparatus of a working machine to perform, by radio control, dangerous work such as mowing lawns on steep golf links and mowing grass on river banks.

More specifically, it relates to a clutch operating apparatus and a traveling brake apparatus in radio-control working vehicles, laser-beam control working vehicles, and various working vehicles and wheeled carriers of other unmanned control types in which a brake is directly controlled by an actuator.

2. Description of the Prior Art

In a conventional automotive working machine of an operator riding type, a traveling brake and a traveling clutch are usually unrelated and individually operated. Moreover, a traveling brake and a traveling clutch are never interlocked in a radio-control automotive working machine of a structure comprising a cutter (blade) which is attached on a lower end of an output shaft of a motor provided on a carriage, a radio transmitter, a radio receiver, and an actuator to operate a traveling transmission and steering wheels in response to signals of the receiver.

Furthermore, in a clutch operating apparatus of the conventional radio-control working machine, an actuator output section and a clutch arm are directly connected. When a traveling clutch of a meshing type is turned on, for example, the crest of a driven clutch collides against the crest of a driving (operating) clutch. Consequently, in order to carry out the clutch functioning operation even in this condition reliably with a certain operating force, springs are generally provided in an operation system. Further, when the clutch is disengaged, there is provided a mechanism to operate it forcibly or through strong springs.

Conventionally, a traveling brake apparatus employed in such a radio-control working vehicle or the like is installed outside of a gear case, e.g., near a wheel, or provided on an outer wall or the like of the gear case, so as to operate a brake shoe directly by an actuator or to operate a brake by hydraulic pressure.

Conventional radio-control automotive working machines involve the following problems.

An operator riding type automotive working machine ridden and operated by a general user and a walking type automotive working machine which travels automatically while it is pressed from behind by a general user who does not ride on it, have a long history, and their operations have been generally known to the public. Since the working machine and the operator always move as one, users in a wide range have accepted steering methods of these working machines. However, a radio-control automotive working machine is extremely unique in that the operation is effected by the tip of a finger in touch with a transmitter at a place remote from the working machine. Further, it is difficult for the operator remote from the working machine to grasp the situation of the working machine, so that he is apt to operate it dangerously.

In addition to this condition, the automotive working machine is very dangerous when no traveling brake is installed in it because even if a traveling clutch is disengaged, it will not stop immediately due to inertia on a slope or a flat ground with a small traveling resistance.

However, even in the case where the radio-control automotive working machine includes a traveling brake, it is necessary to effect disengagement of a traveling clutch and brake operation at once by a transmitter unless the brake is interlocked with the traveling clutch. Therefore, especially for a general user who does not drive and operate such a working machine every day, danger avoiding operation in an emergency is more complicated, thereby reducing the effect produced by installing the brake to half.

With a structure in which the brake functions when the traveling clutch is neutral, it is difficult to move the working machine by a human hand push. In consequence, the force of a motor must be always used for moving the working machine so that the operation will be troublesome.

Concerning a mower used on a golf link whose turning radius is small, installation of a differential gear is essential for preventing the mower from damaging a lawn by a slip of its tire when the mower turns. In the case where a mower includes a differential gear, traveling brakes are generally provided on a plurality of wheels. However, along with the traveling brakes, actuators for functioning them must be also installed, thus increasing the cost.

For the danger avoiding operation by the transmitter, it is an absolute condition to be easy and not induce errors. However, the operation of the conventional radio transmitter is complicated.

The above-described problems are solved by the present invention in which a traveling brake interlocking with a traveling clutch is installed to quicken a stop operation of a working machine, a mechanism for releasing the brake is provided to prevent inconvenience in handling the working machine, the brake is connected to only one of the wheels so as to suppress a cost increase for brake installation to the minimum, and mechanisms and locations of switches of a transmitter are elaborately designed to carry out danger avoidance by transmitter operation more reliably.

In the conventional radio-control mower, excessive force is exerted on an operation system of an actuator output section and a clutch arm, which results in troubles. Such troubles are caused less in operation with a hydraulic mechanism or in a hydraulic-type change gear, but they are disadvantageous in cost, size and weight in comparison with a mechanical type (meshing type) transmission mechanism which the invention intends to provide.

In the case of a meshing-type clutch, e.g., a claw clutch, an operation force substantially in proportion to an amount of a transmission load exerted on the clutch is necessary for disengaging the clutch during power transmission. In order to realize this with an actuator as small as possible, it is not favorable to provide springs and the like in the operation system, and the motive power of the actuator must be utilized directly as an operation force most effectively.

On the other hand, shock absorbing means such as springs are indispensable for the operation system in order to avoid an excessive load when the crests of the clutches collide against each other, as described before.

The present invention intends to solve the above-described drawbacks not only in the clutch operating apparatus of the radio-control working machine but also in an operational structure where motive power of an actuator is transmitted to a clutch arm through mechanical transmission, and a clutch of a meshing type is employed.

In order to decrease the working machine in size, weight and cost, a mechanical brake apparatus is more advantageous as the traveling brake apparatus than a hydraulic operation type. However, since a braking force of a general mechanical brake apparatus is in proportion to an operation force of a brake shoe, a powerful actuator is required for operating the brake shoe in a radio-control working vehicle or the like.

Further, in order to ensure a constant brake performance, various equipments are necessary for maintaining the operation force at a certain level and for protecting the brake from water and dust.

SUMMARY OF THE INVENTION

It is therefore an object of the present invention to solve a large number of problems described above by providing a traveling control apparatus of the following structure in a radio-control automotive working machine comprising a cutter which is attached on a lower end of an output shaft of a motor mounted on a carriage, a radio receiver, and an actuator to operate a traveling transmission and steering wheels in response to signals of the receiver.

(1) A traveling brake and a traveling clutch are provided in such a manner that the traveling brake functions when the traveling clutch is neutral. In consequence, when the traveling clutch is disengaged, the brake automatically functions so that it is unnecessary to operate the brake, thereby ensuring the function of the brake.

(2) The radio-control automotive working machine according to Article (1) includes a mechanism for releasing the function of the traveling brake. With the brake function releasing mechanism, the working machine can be moved by hand push without motive power.

(3) Although the traveling brake is connected to only one of the traveling wheels, this can attain the object adequately and can reduce the cost to the minimum.

(4) Switches for operating a traveling clutch which are provided on a radio transmitter are independent switches for advancing and retreating operations, and the switches are located in the vicinity of a side surface either on the left or on the right with respect to the vertical center line of the front surface of the transmitter, and maintained at an appropriate distance such that they can not be easily operated simultaneously, while occupying such positions that the advancing operation is easier to perform than the retreating operation, the switches being designed to transmit a clutch 'on' signal only when each of them is turned on by a finger of an operator. With such an elaborate arrangement, the stop operation can be simplified so that it can be effected reliably and quickly.

(5) A differential gear and a differential-gear lock are provided in a gear case so that the differential gear lock and a brake function when a traveling clutch is neutral. Thus, the brake mechanism at one wheel can also cover the other wheel by way of the differential gear.

(6) A mechanism is provided for functioning a differential-gear lock only when a steering angle of steering wheels is in a predetermined range, and the differential-gear lock and a brake are designed to function prior to this when a traveling clutch is neutral, to thereby realize the interlocking between the differential-gear lock and the traveling clutch and the traveling brake so as to give priority to the stop operation.

(7) A working machine includes an emergency stop switch, an electric circuit for stopping a motor when this switch is turned on, and an electric circuit for functioning the brake prior to interlocking with the traveling clutch. Thus, interlocking between the brake and the emergency stop switch is given priority over interlocking between the brake and the traveling clutch, and then, the brake functions.

(8) As for a traveling clutch, the invention intends to provide a method of extracting the most effective motive power from the actuator output section. In a traveling change mechanism of the clutch comprising a traveling clutch section, a clutch operating section and an actuator, a clutch arm is provided on a shifter shaft, and there are provided independent clutch levers which have a movement locus partially or wholly superposed on a rotation locus of the clutch arm, while the clutch levers and the clutch arm have elastic members interposed therebetween so that the clutch levers extend along the clutch arm, the actuator including two cams on the left and right which have side slots opposite to each other so as to clamp an eccentric projection provided on an output shaft of the actuator, the cams and the clutch levers being connected by rods.

(9) As for a traveling brake, the invention provides a brake apparatus which exhibits a more reliable and stronger braking performance with the smallest actuator and which can function stably. As such a brake apparatus in an automotive working vehicle or the like operated by radio control, there are provided a first brake clutch attached on an output shaft in a gear case so that it can slide on and transmit motive power to the output shaft, a second brake clutch which can mesh with the first brake clutch, and braking means for giving the second brake clutch a braking load with respect to the gear case.

(10) The above-mentioned braking means comprise the second brake clutch having teeth to mesh with the first brake clutch which are formed on one end of the second brake clutch and a flange formed on the other end, the second brake clutch being fitted around a drive shaft, an annular braking flange fitted around the second brake clutch and attached on the gear case at a position which can be controlled, and a conical spring washer interposed between the second brake clutch and the braking flange.

With this apparatus, the most effective motive power can be extracted from the actuator output section. In other words, in order to turn on the clutch to the advancing (or retreating) position, the elastic members between the clutch levers and the clutch arm are extended to serve as shock absorbing means when the crests of the clutches collide against each other, and also, in order to disengage the clutch, the clutch levers directly press the clutch arm, thereby exercising the maximum operational capacity.

The clutch operated by the actuator is attached on the drive shaft so as to slide on and transmit motive power to the shaft, and the clutch to mesh with this clutch is secured in an appropriately braked condition in the traveling transmission. Therefore, it is possible to brake the drive shaft when the actuator displaces the clutch with the minimum force. The braking force then can be determined to have a required amplitude by changing a braking part such as the conical spring washer interposed between the second brake clutch and the braking flange, or by adjusting screw-fasteners for attachment of the braking flange to the gear case.

Moreover, the clutches and the braking parts are provided inside of the gear case, so that wear of these parts can be suppressed to the minimum, and that influences of the environment over the performance can be reduced to the minimum.

DETAILED DESCRIPTION OF THE PREFERRED EMBODIMENTS

Figure 1:
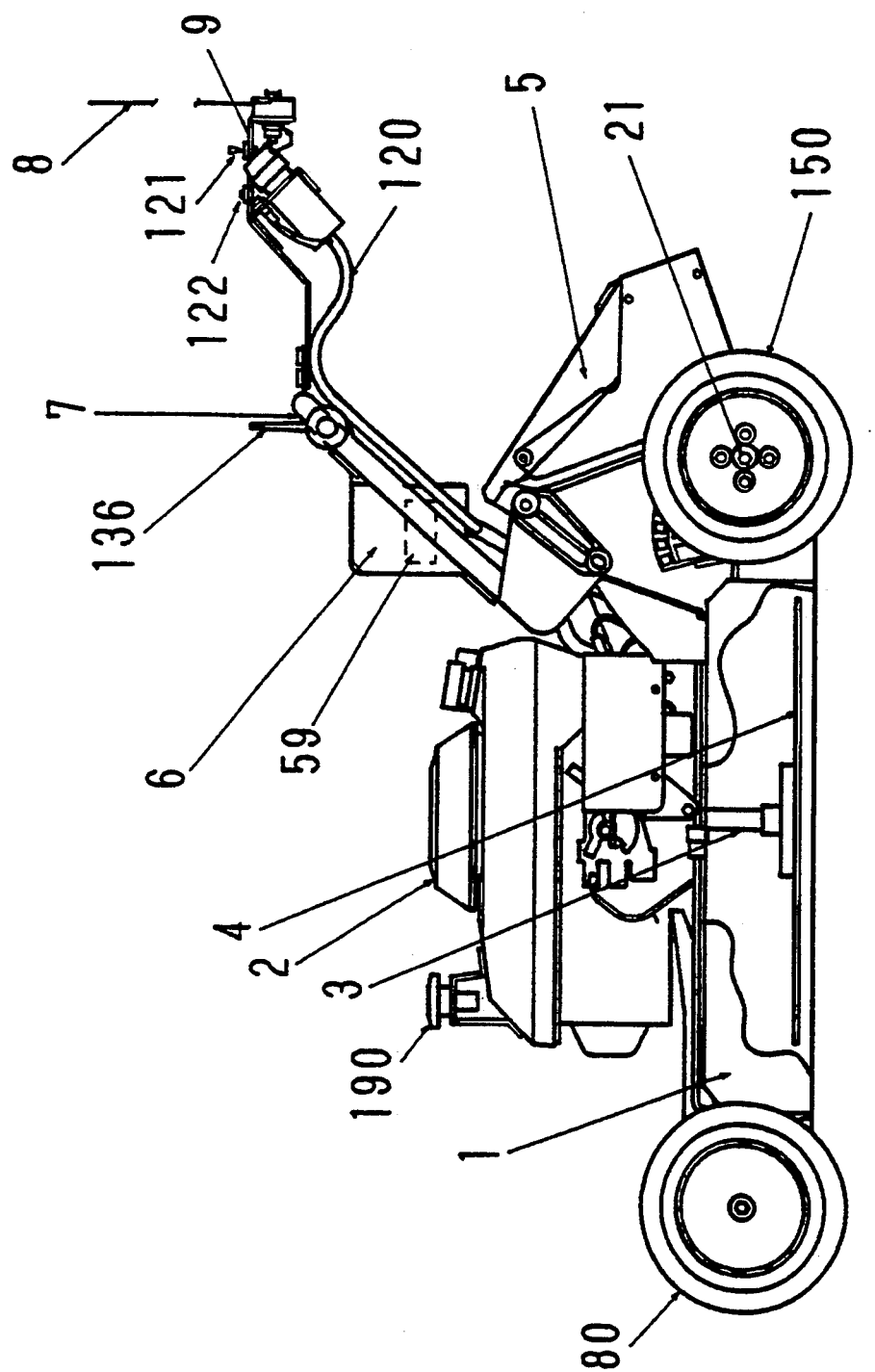
FIG. 1 is a side view of a radio-control automotive working machine on which a traveling control apparatus is mounted.
Figure 2:
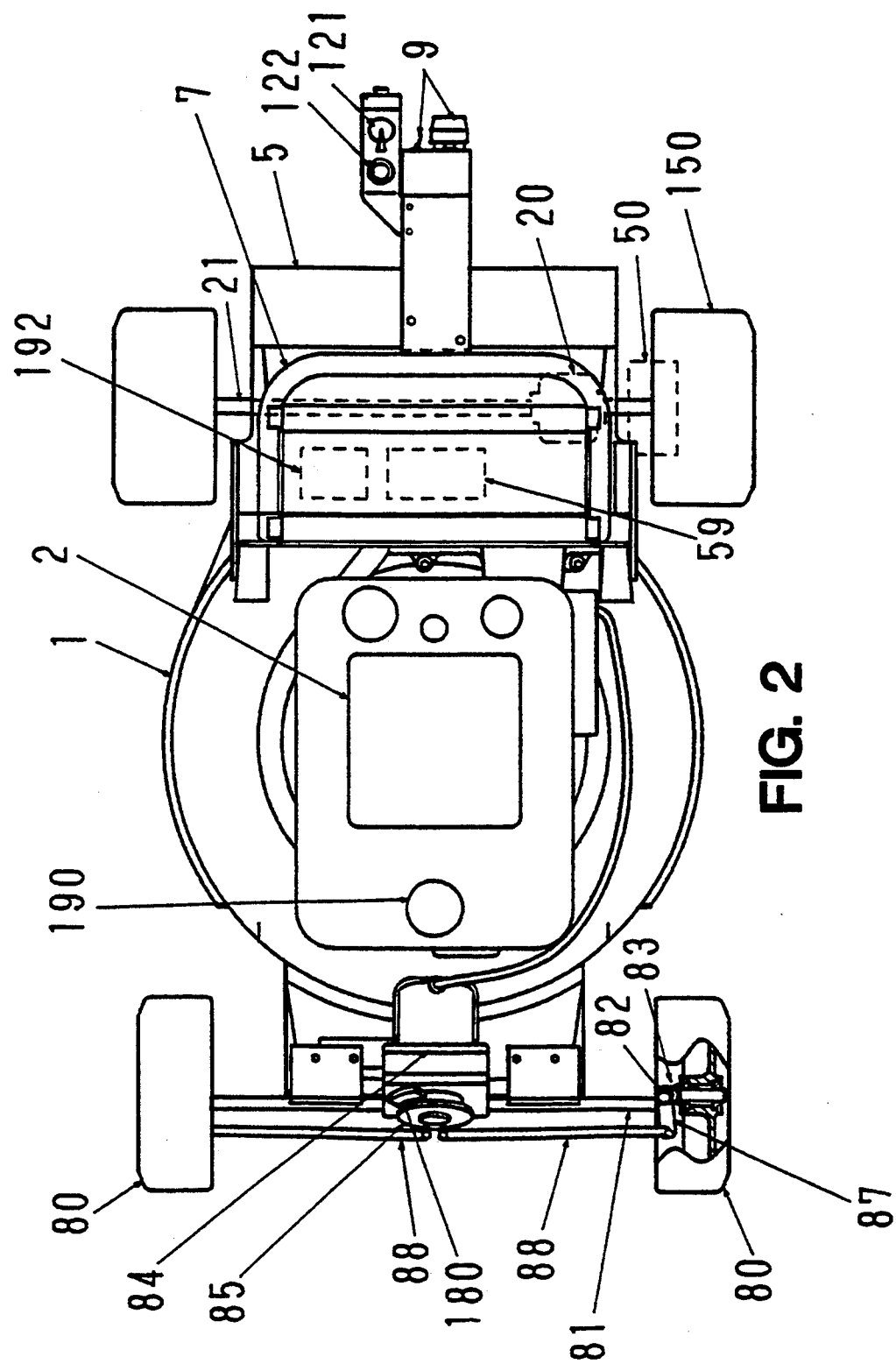
FIG. 2 is a plan view of FIG. 1.

Referring to FIGS. 1 and 2, a radio-control automotive working machine according to the present invention includes a power source 2 (referred to as the engine in this embodiment) which is securely fixed substantially at the center of a carriage 1. An output shaft 3 of the engine extends in the carriage 1 so as to be substantially perpendicular to the ground surface, and a blade 4 is attached on an end portion of the output shaft 3. A discharge opening, a discharge cover 5 and so forth for discharging grass chips cut by the blade 4 are provided at the back of the carriage 1. Also, a control box 6 containing electric equipment, a battery, and the like which are required for radio control and other control, a handle 7 for sustaining a machine body, a radio receiver antenna 8, a power switch 9 and so forth are provided at the back of the carriage 1.

Figure 3:
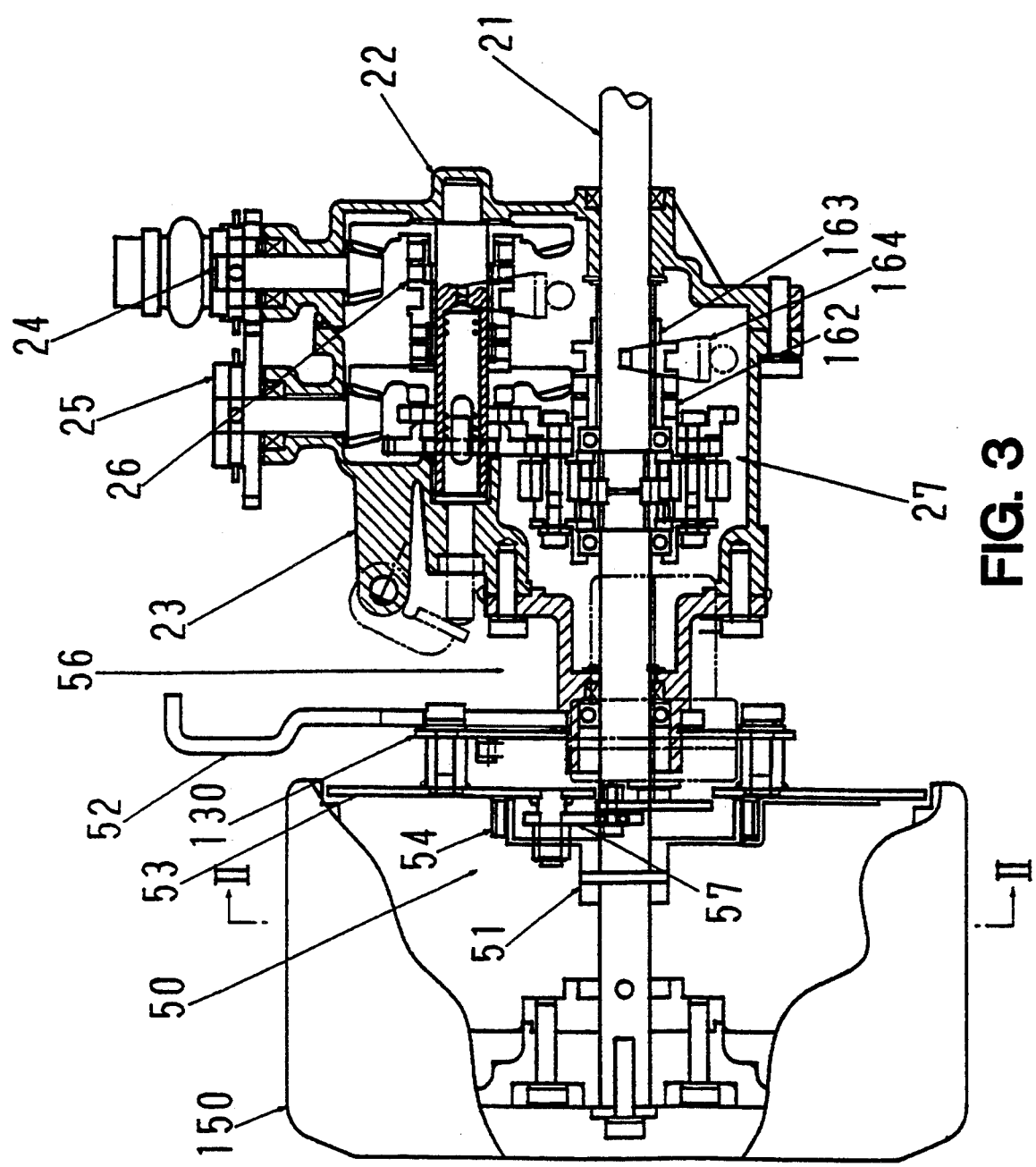
FIG. 3 is a cross-sectional view showing a traveling transmission, taken along the line I—I of FIG. 4(a), and partially showing a rear wheel in cross section.

In the case of rear-wheel drive as in this embodiment, a traveling transmission 20 is provided at the back of the carriage 1, and a rear-wheel drive shaft 21 is projected from both sides of the traveling transmission 20. As shown in FIGS. 3 and 4(a) and (b), the traveling transmission 20 comprises gear cases 22, 23, an input shaft 24, an input gear 25 for reverse rotation, a traveling clutch 26, a differential gear 27, the rear-wheel drive shaft 21, a traveling clutch arm 28, a traveling clutch servo 29, a clutch rod 30, and so on. The traveling clutch servo 29 is designed to rotate a servo horn 31 in response to a signal from a receiver 59, to thereby displace the traveling clutch 26 to a forward driving position (F), a rearward driving position (R) and a neutral position (N) or to maintain it in such a position through the clutch rod 30 and the traveling clutch arm 28.

Figure 5:
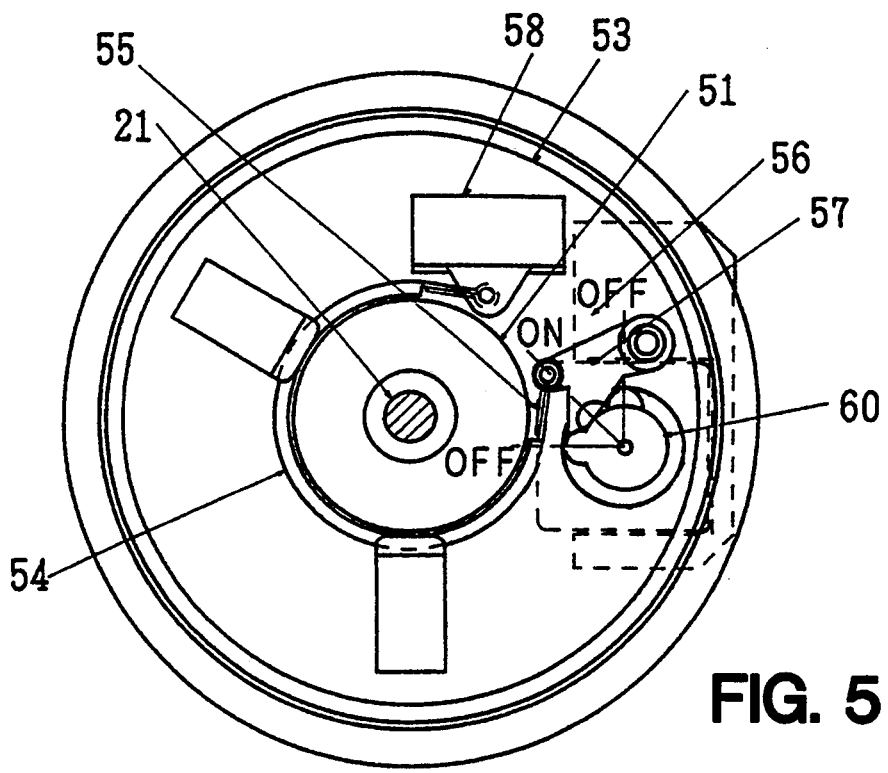
FIG. 5 is a cross-sectional view showing the rear wheel, taken along the line II—II of FIG. 3.
Figure 6:
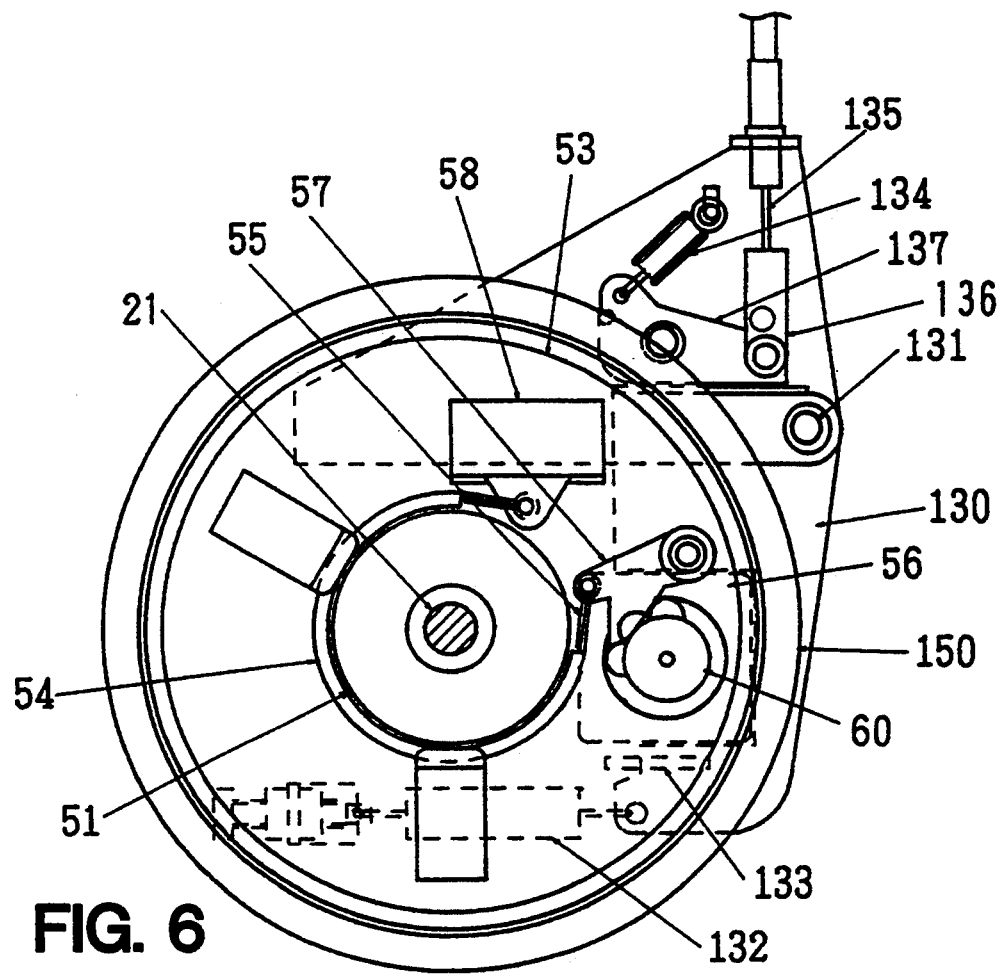
FIG. 6 is a cross-sectional view showing another embodiment of FIG. 5 equivalent to that portion of the rear wheel which is taken along the line II—II of FIG. 3.

Referring now to FIGS. 3 and 5, a traveling brake 50 comprises a brake drum 51 directly connected to the rear-wheel drive shaft 21 (rear wheels), and a brake shoe attachment plate 53 connected to a stay 52. The brake shoe attachment plate 53 consists of a brake shoe 54, a brake arm 55, a brake servo 56, a brake cam 57, a stopper arm 58 and so on. The brake servo 56 and the traveling clutch servo 29 are electrically interlocked to rotate the respective servo horns 31 and 60 in the same phase in response to a signal from the receiver 59. The servo horn 60 and the brake arm 55 are interlocked by the brake cam 57 so that, as shown in FIGS. 5 and 6, the traveling brake 50 functions only when the traveling clutch 26 is neutral by setting the positional relation between the servo horn 60, the brake cam 57 and the brake arm 55. Even if the traveling brake 50 is provided at some location from the input shaft of the traveling transmission 20 to the output shaft, substantially the same mechanism can be constituted.

Figure 4B:
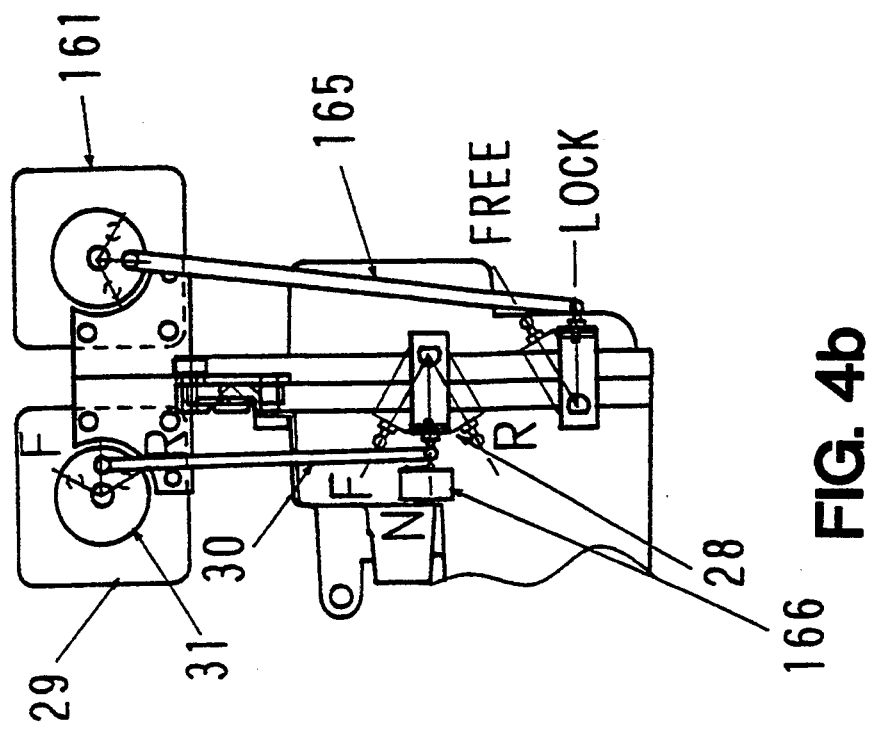
FIGS. 4(a) and (b) are a side view of the traveling transmission and a side view showing an essential portion of the same, respectively.
Figure 4A:
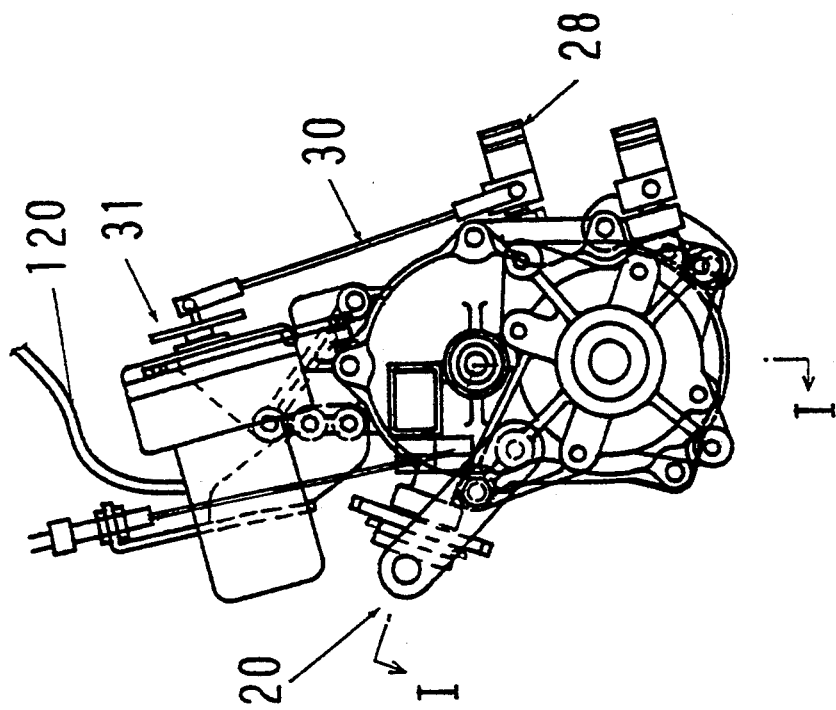

As another embodiment in which the traveling brake 50 functions only when the traveling clutch 26 is neutral, there is also a method of electrically interlocking a microswitch 166 (FIG. 4(b)) and the brake servo 56 so that the microswitch 166 detects that the traveling clutch arm 28 is at the neutral position, and that the brake servo 56 located at the middle of FIG. 3 functions in a brake functioning direction in response to the detection signal.

In this embodiment, checking of the traveling clutch 26 being neutral can be performed more reliably than the above-described embodiment. Therefore, the traveling brake 50 hardly ever functions by erroneous operation of the servo or the like when the traveling clutch 26 is not neutral.

As shown in FIG. 2, each of steering wheels (front wheels) 80 is rotatably attached to a collar-like bracket 83 which is provided rotatably with respect to a shaft 82 of a swing arm 81 at the front portion of the carriage 1. Further, a steering servo 84 is provided near the center of the front portion of the carriage 1, and a steering rod 88 extends from a steering servo horn 85 to an arm 87 for fixing each of the brackets 83.

Figure 7:
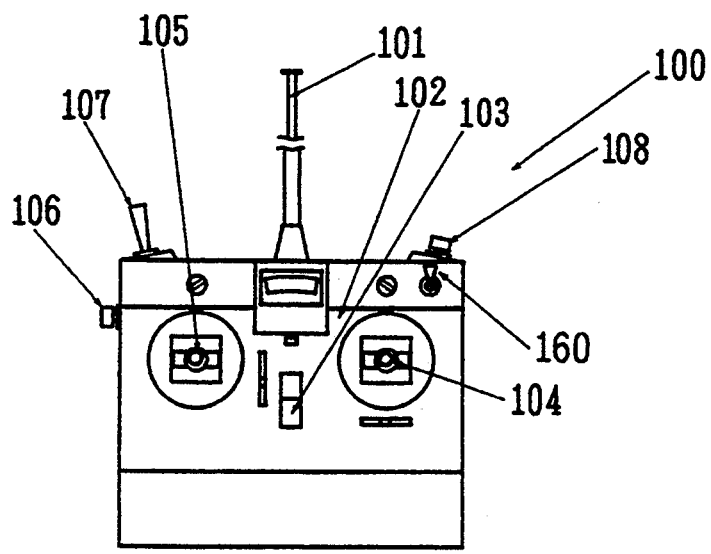
FIG. 7 is a front view of a transmitter.
Figure 8:
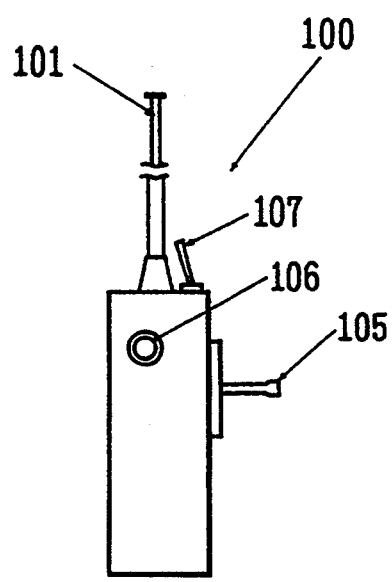
FIG. 8 is a side view of the same transmitter.

FIGS. 7 and 8 illustrate a transmitter 100 required for radio control. An antenna 101 is fixed on the top. On a transmitter panel 102 on the front surface, there are provided a power switch 103 at the center, a steering lever 104 on the right, and an engine control lever 105 on the left. A traveling clutch switch 106 for forward driving is attached on the left side surface, and a traveling clutch switch 107 for rearward driving is provided on the left of the top surface. An engine stop switch 108 is attached on the right of the top surface, and a differential-gear lock switch 160 is provided on the right side surface.

On the other hand, the main body of the automotive working machine shown in FIG. 1 includes a brake release switch 121 and a pilot lamp 122 which are provided on a signal conductor 120 connecting the receiver 59 with the brake servo 56 shown in FIG. 3.

In order to release the traveling brake 50, the transmitter 100 and the receiver 59 are switched on, and with the traveling clutch switch (for advancing 106 or retreating 107) of the transmitter 100 being turned on (i.e., with the traveling brake 50 being unoperated), the brake release switch 121 is turned on. Then, the signal from the receiver 59 is interrupted, and the brake servo 56 is maintained in the unoperated state. At the same time, the pilot lamp 122 is lighted to indicate this brake unoperated state because the pilot lamp 122 is electrically interlocked with the brake release switch 121.

FIG. 6 illustrates another embodiment of the brake apparatus in which the brake is released mechanically. In this embodiment, the brake servo 56 is attached on the brake shoe attachment plate 53 through a servo base 130, and the servo base 130 which is rotatable about a pin 131 maintains the brake servo 56 at a certain location by a spring 132 and a stopper 133. On the other hand, a control cable 135 is connected to the servo base 130 through a spring 134 and a brake cam 137. A brake release lever 136 is connected to the other end of the control cable 135. When the brake release lever 136 is pulled, the servo base 130 is rotated against the force of the spring 134, and the brake cam 137 and the servo horn 60 are separated. Thus, the brake is forcibly released whether or not the signal is transmitted from the receiver to the brake servo.

In the traveling brake 50 illustrated on the left of FIG. 3, the brake drum 51 is securely fixed on only one end of the rear-wheel drive shaft 21 projecting opposite directions from the traveling transmission 20, as shown in FIG. 2, and the brake shoe attachment plate 53 is secured on the stay 52. Component parts in relation to the brake are not mounted on the other end of the rear-wheel drive shaft 21.

For example, when the working machine descend a slope, either an engine brake or the traveling brake suppresses an increase in the traveling speed while grips of rear-wheel tires 150 with respect to the road surface are maintained because the traveling clutch 26 (FIG. 3) and the traveling brake 50 are interlocked. Consequently, the traveling speed will not largely exceed a normal operation speed due to inertia. Since the traveling speed is relatively low, braking of only one wheel will not cause a sudden change in the advancing direction of the working machine even in the case of a differential gear type. Moreover, since the differential-gear lock is essential for traveling and turning on a slope of 20 degrees or more, the differential-gear lock inevitably enables strong braking even on a steep slope. This has been already confirmed by tests.

Furthermore, in relation to reduction of the manufacturing cost, it is more favorable to mount less brakes on the working machine. The present invention is also effective in this respect. Even in the case of a traveling transmission including no differential gear, this effectiveness is unchanged.

As described before, on the operation panel 102 of the transmitter shown in FIG. 7, the traveling clutch switch 106 for advancing is located at a position on the side surface at a corner, and the traveling clutch switch 107 for retreating is located at a position on the top surface at the corner. The advancing switch 106 is a push type so that the traveling clutch is at the forward driving position when the switch is pushed, and that the clutch is at the neutral position when the switch is released. The retreating switch 107 is a toggle type designed in such a manner that the traveling clutch is at the rearward driving position when the switch is inclined toward the front, and that the clutch is at the neutral position when the switch is released.

In order to operate the transmitter, the transmitter is supported by second, third and fourth fingers of both hands of an operator, and therefore, the advancing switch is operated by a first finger. Since the retreating switch is likewise operated by the first finger, these two switches can not be easily operated simultaneously. Further, the advancing switch of the push type and the retreating switch of the toggle type, which are different in operational manners, will induce less erroneous operations.

When the working machine must be stopped urgently, an instantaneous operation is required. Consequently, it is necessary that especially an operator who is not used to operation of the working machine can perform the stop operation as if by reflex action. For this purpose, releasing the finger from the traveling switch to stop the machine is the most suitable method.

In this invention, the traveling clutch 26 and the traveling brake 50 are interlocked, and the transmitter switches have the above-described functions, so that the working machine can be stopped quickly and reliably by a simple operation such as releasing the finger from the traveling switch.

One channel for differential-gear lock operation (the switch 160) is provided on the transmitter (FIG. 7). This switch is a toggle type designed to transmit a signal for engaging a dog clutch 163 (FIG. 3) with a claw section 162 when the switch is inclined upwardly and a signal for disengaging them when the switch is inclined downwardly. There is installed a dog clutch operating actuator 161 (FIG. 4(b)) which functions in response to a signal from the receiver 59 (FIG. 1). The differential-gear lock claw section 162 (FIG. 3) and the dog clutch 163 opposite to it are provided in the gear cases. There are provided a clutch fork 164 for turning the dog clutch on and off, a rod 165, and the microswitch 166 (FIG. 4(b)) in the vicinity of the traveling clutch arm 28 (FIG. 4), and they are electrically interlocked to effect the differential-gear lock prior to a command from the receiver only when the traveling clutch is neutral.

Thus, the brake which is only mounted on one wheel becomes effective over the other wheel interlocked by the differential-gear lock, to thereby obtain much stronger braking effect.

Moreover, as shown in FIG. 2, in the case where a sensor 180 for detecting a steering angle is installed in the vicinity of a front-wheel steering servo horn 85, and the sensor 180 and the dog clutch operating actuator 161 are electrically interlocked so that the differential-gear lock is effected when the steering angle is in a certain range, the microswitch 166 and the dog clutch operating actuator 161 are electrically interlocked (FIG. 4(b)) so that the differential-gear lock is effected when the traveling clutch arm 28 is neutral in response to a signal from the microswitch 166 attached near the traveling clutch prior to the above-mentioned interlocking operation.

With this arrangement, there can be realized interlocking of differential-gear lock and the traveling clutch 26 and the traveling brake 50 so as to make the stop operation the first priority.

Furthermore, an emergency stop switch 190 is provided at such a location as to be easily operated from the front of the working machine (FIGS. 1 and 2). The emergency stop switch 190 is connected to the engine through a relay so that a primary current of the engine will be kept discharged when this switch is turned on. Also, an electric circuit 192 is provided to function the traveling brake prior to the interlocking operation with the traveling clutch when the emergency stop switch 190 is turned on, thereby enhancing the traveling safety of the automotive working machine operated by remote control.

Next, the structure of a traveling drive portion will be described in detail.

Figure 9:
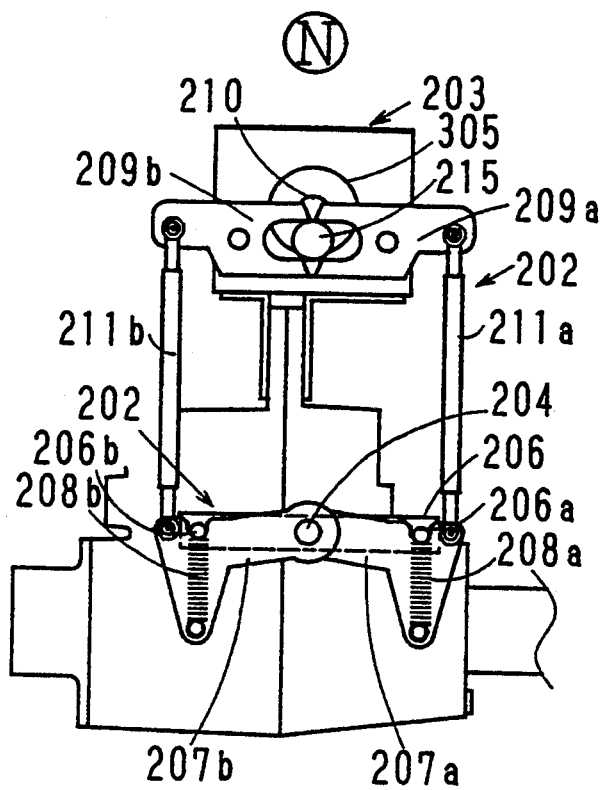
FIG. 9 is a front view of a clutch operating section when a clutch is neutral.
Figure 10:
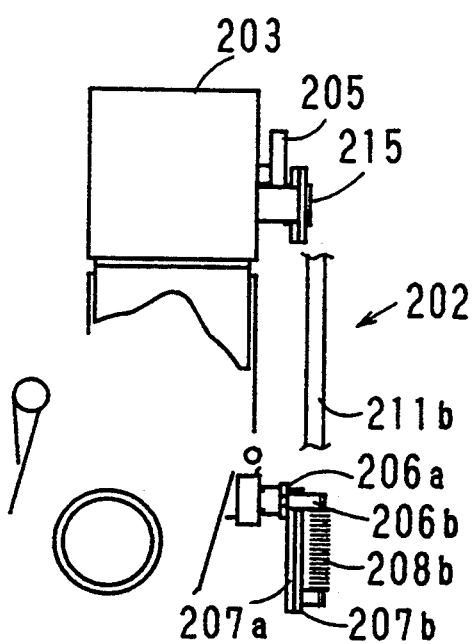
FIG. 10 is a side view of the clutch operating section.
Figure 11A:
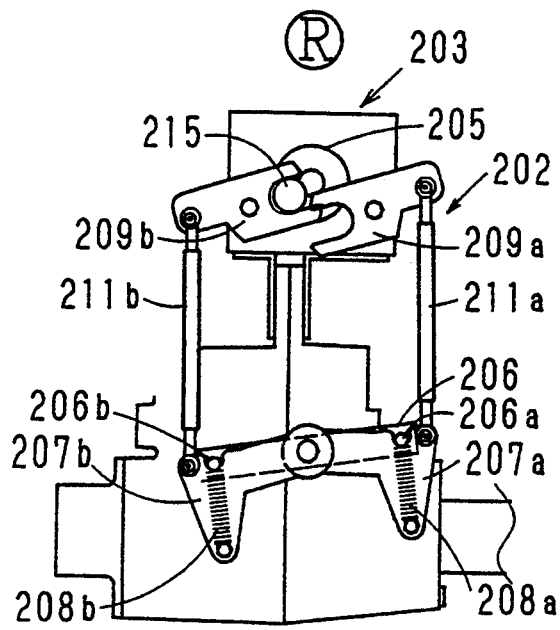
FIGS. 11(a), (b) and (c) are front views of the clutch operating section when the clutch is at a rearward driving position, when the clutch is about to be turned to a forward driving position and when the clutch is at the forward driving position, respectively.
Figure 11B:
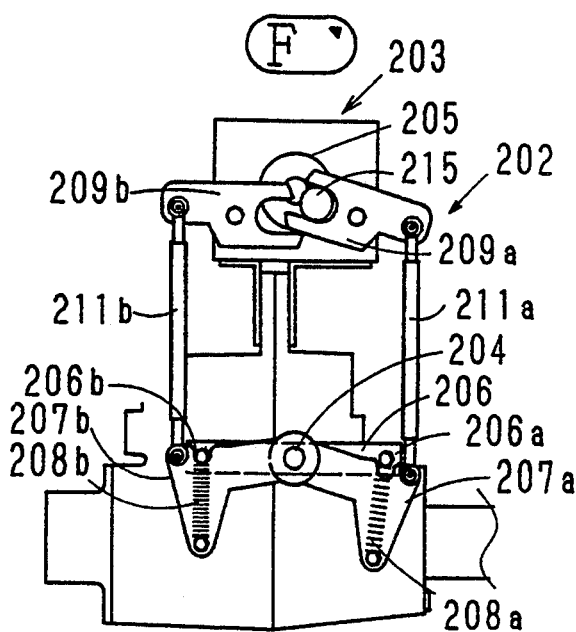
Figure 11C:
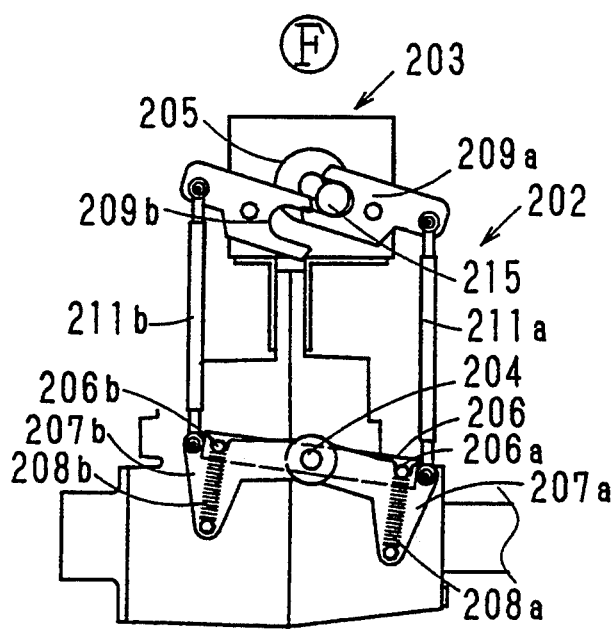
Figure 12:
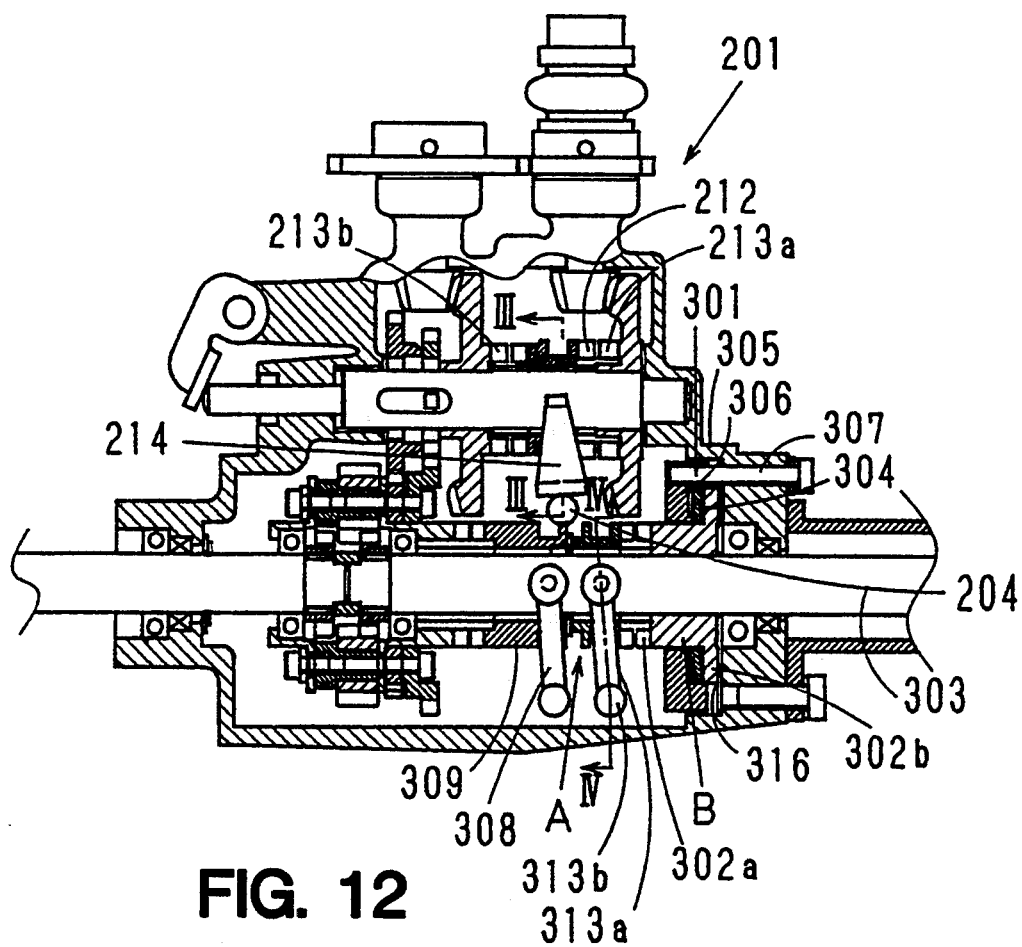
FIG. 12 is a cross-sectional view of a traveling transmission including a traveling brake apparatus which is provided in a gear case.
Figure 13:
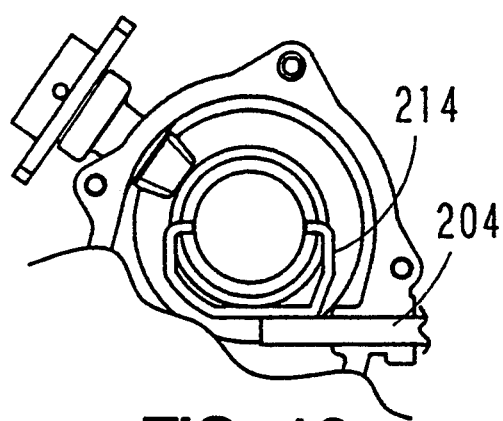
FIG. 13 is a cross-sectional view of a traveling clutch section, taken along the line III—III of FIG. 12.

FIGS. 9 to 13 specifically show a traveling change mechanism of the clutch which consists of a traveling clutch section 201, a clutch operating section 202 and an actuator 203. As shown in FIGS. 12 and 13, a shifter shaft 204 operates a shifter fork 214 of the traveling clutch section 201. As shown in FIGS. 9 to 11, a clutch arm 206 extends from the shifter shaft 204 toward opposite sides along a direction perpendicular to the axis. In this embodiment, two clutch levers 207a and 207b are provided on the left and right coaxially with the clutch arm 206 and individually rotatably. The clutch levers 207a and 207b need not be always coaxial with it. That is to say, the clutch levers may be located in any manner so long as they have a movement locus perpendicular to or in parallel to a rotation locus of the clutch arm 206. Elastic members 208a and 208b are interposed between the clutch levers 207a, 207b and spring pins 206a, 206b of the clutch arm 206 so that the two clutch levers 207a and 207b extend integrally along the clutch arm 206. On the side of the actuator 203, two left and right cams 209a and 209b are provided so that their side slots are opposite to each other in order to clamp an eccentric projection 215 of an output flange 205 provided on an output shaft 210 of the actuator 203. Although tension springs are employed as the elastic members 208a and 208b in this embodiment, substantially the same function and effect can be realized with compression springs if configurations and positional relation of the clutch arm 206 and the clutch levers 207 are changed. Other than springs, rubber or such elastic members can also produce substantially the same function and effect. End portions of the cams 209a, 209 on the opposite side of the fulcrum and the clutch levers 207a, 207b are connected by rods 211a, 211b, respectively.

With this structure, the actuator output flange 205 is rotated counterclockwise in response to an advancing signal F, and the projection 215 secured on the output flange 205 is also rotated from the lowermost position to the upper right. Since the cam 209a is pushed up by the projection 215 and inclined to the lower right, the clutch lever 207a connected through the rod 211a is pressed down, as shown in FIG. 11(b). Through the elastic member 208a securely fixed on the clutch lever 207a, the clutch arm 206 is rotated to the lower right so that the shifter fork 214 presses a driven clutch 212 against a driving clutch (advancing side) 213a (FIG. 12).

If the crests of these two clutches collide against each other then, the shifter fork 214 and the clutch arm 206 will be stopped from moving. Therefore, as shown in FIG. 11(b), the elastic member 208a is extended and continues to generate a certain pressing force.

When the crests and roots of the clutches mesh with each other, the clutch arm 206 is simultaneously attracted toward the clutch lever 207a due to the spring force, as shown in FIG. 11(c), thereby completing the clutch operation.

On the other hand, the cam 209b has a right end portion shaped to release the eccentric projection 215 so that when the bearing is rotated to the upper right in response to the advancing signal F, the cam 209b will be free from the movement of the actuator while the movement of the cam 209b is controlled only by the clutch arm 206 connected through the rod 211b. With this structure, the cams 209a and 209b can convert the power of the actuator into the clutch displacement without influencing each other.

In the case of the retreating position (R), the operation is substantially the same. That is to say, the actuator output flange 205 is rotated clockwise in response to a retreating signal R, and the projection 215 secured on the output flange 205 is also rotated from the lowermost position to the upper left. Since the cam 209b is pushed up by the projection 215 and inclined to the lower left, the clutch lever 207b connected through the rod 211b is pressed down, as shown in FIG. 11(a). Through the elastic member 208b securely fixed on the clutch lever 207b, the clutch arm 206 is rotated to the lower left so that the shifter fork 214 presses the driven clutch 212 against a driving clutch (retreating side) 213b (FIG. 12).

When the clutch is returned from the advancing position (F) or the retreating position (R) to the neutral position (N), a clutch operating force is increased in proportion to a traveling drive load. Consequently, there is required an actuator having a driving capacity to enable the clutch operation under the largest possible traveling drive load. Moreover, the loss in relation to the mechanism for returning the clutch to the neutral position must be suppressed to the minimum, and this can be realized by the structure in which the clutch levers 207a, 207b press the clutch arm 206, the rods 211a, 211b, and the cams 209a, 209b directly, not through springs.

As another method for ensuring the clutch being neutral, enlargement of a neutral region on the clutch stroke can be suggested. In this case, the operation stroke which the actuator is demanded to have is increased in accordance with an increase of the clutch stroke, resulting in a problem that the actuator must be strengthened with an increase in the cost.

Furthermore, in order to ensure the safety of traveling operation, it is an important factor to obtain accuracy of the neutral position. The cams 209a and 209b clamp the projection 215 on the output flange 205, and as shown in FIG. 9, distal end portions of these cams near the center are designed to extend above and below the projection 215 along its axial direction, so that when the projection 215 is at the neutral position, movements of these cams are restricted simultaneously. This plays a significant role in ensuring the accuracy of the neutral position.

Next, a traveling brake apparatus incorporated in a gear case of a traveling transmission will be described in detail.

Figure 14:
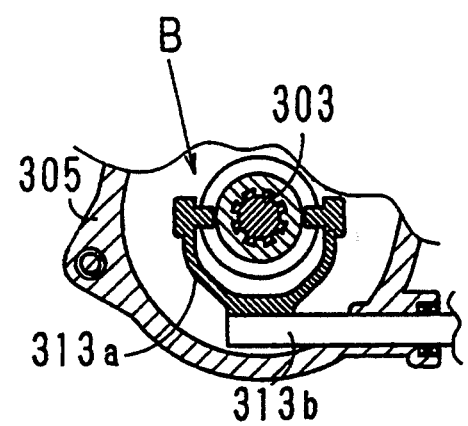
FIG. 14 is a cross-sectional view taken along the line IV—IV of FIG. 12.
Figure 15:
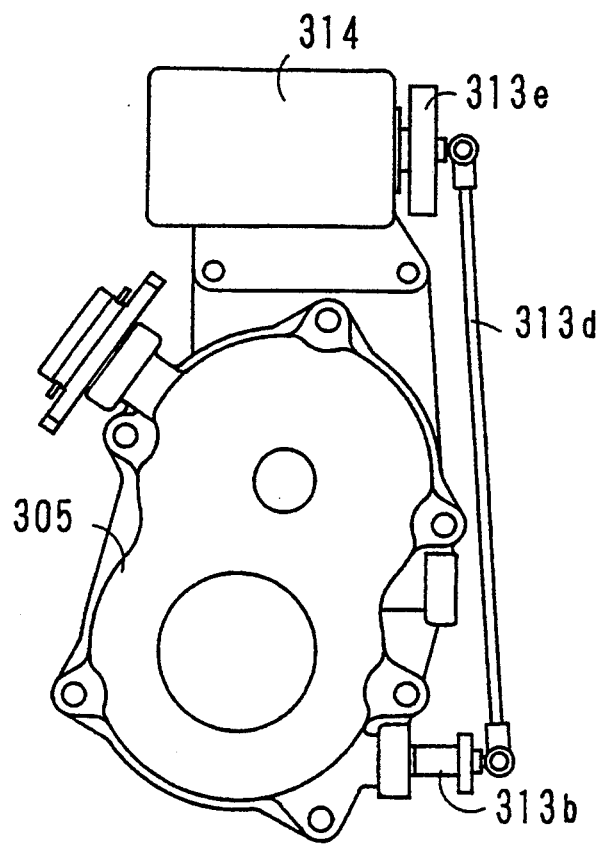
FIG. 15 is a front view of the traveling transmission.
Figure 16:
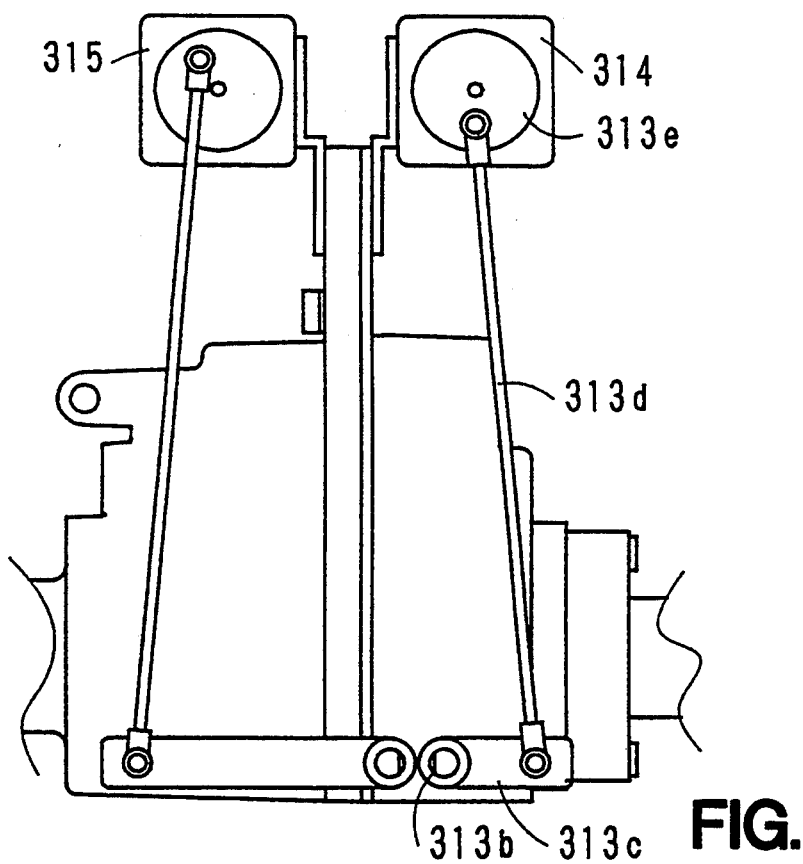
FIG. 16 is a side view of the same traveling transmission.

FIGS. 12 and 14 illustrate the interior of the traveling transmission in the automotive working machine which includes the traveling brake apparatus and operates traveling drive by radio control. A brake clutch A is provided to slide on a drive shaft 303 in a gear case 305 and to transmit motive power to it. An ordinary clutch 309 to be operated by a differential-gear lock shifter fork 308 is provided adjacent to the brake clutch A. The brake clutch A also includes a shifter fork 313a, and as shown in FIGS. 15 and 16, a shifter shaft 313b connected to it is connected to a brake servomotor 314 by way of a brake arm 313c, a rod 313d and a servo horn 313e. A differential-gear lock servomotor 315 for operating the above-mentioned differential-gear lock shifter fork 308 is provided adjacent to the brake servomotor 314.

This traveling brake apparatus is shown in a lower right portion of FIG. 12. A brake clutch B which can mesh with the brake clutch A is coaxially provided on the drive shaft 303. As braking means 301 for giving the brake clutch B a braking load with respect to the gear case, there are provided the brake clutch B fitted around the drive shaft 303 and including teeth 302a to mesh with the brake clutch A which are formed on one end of the brake clutch B and a flange 302b formed on the other end, an annular braking flange 306 fitted around the brake clutch B and attached on the gear case 305 at a position which can be controlled by a braking adjustment bolt 307, and a conical spring washer 304 interposed between the brake clutch B and the braking flange 306. A thrust plate 316 is provided between the brake clutch B and a bearing of the drive shaft 303 of the gear case 305.

With this structure, when the actuator receives a braking command from the receiver, the servo horn 313e is rotated for a predetermined angle, and the brake arm 313c is rotated by the rod 313d connected to it. At the same time, through the shifter shaft 313b, the shifter fork 308 brings the brake clutch A into engagement with the brake clutch B. A required braking load is applied to the brake clutch B by the thrust plate 316, the conical spring washer 304, the braking flange 306 and the braking adjustment bolt 307. Therefore, when these two brakes mesh with each other, wheels directly connected to the drive shaft 303 are braked.

The gear case is filled with lubrication oil, and the braking parts are adequately lubricated. Consequently, wear of these braking parts can be suppressed to the minimum, and the braking performance can be maintained at a constant level for a long time.

When the actuator receives a brake release command from the receiver, the brake clutches A and B are disengaged from each other in a similar manner, braking on the drive shaft 303 is removed.

In the traveling control apparatus of the radio-control automotive working machine according to the present invention, the traveling clutch and the traveling brake have the above-described structural relation, so that the working machine can be stopped from traveling reliably by the minimum operation. Further, in the case where it includes the differential-gear lock control mechanism to enhance the traveling efficiency especially on a slope or uneven surface, the differential-gear lock mechanism can be used for increasing the braking force. In other words, the function of the brake which is only mounted on one of the rear wheels is applied to the other wheel through the differential-gear lock, to thereby enhance the braking force.

Also, in the case where the steering operation and the differential-gear lock are interlocked, the stop mechanism can be reliably operated by making the interlocking relation between the brake and the differential-gear lock prior to the interlocking relation between the brake and the traveling clutch.

In the case where the emergency stop switch is provided, the safety can be increased by functioning the traveling brake by use of this switch prior to the interlocking with the traveling clutch.

As a result, there is no problem in that the brake apparatus is mounted only on one wheel, thus reducing the cost and enhancing the traveling safety.

The clutch section is a mechanical type (meshing type) transmission mechanism which is advantageous in cost, size and weight. It is possible to provide a clutch operating mechanism which has a long durability and is reliably operated with the minimum actuator.

As for the brake section, by installing it in the gear case of the traveling transmission, it is possible to provide a traveling brake apparatus which is small in size, low in cost, strong and constant in performance with the minimum actuator and the minimum structural space.

As described heretofore, the radio-control automotive working machine of the invention is the most effective in operation on a slope which has a high operation load and is highly dangerous.

What is claimed is:

1. A radio-control automotive working machine comprising a motor mounted on a carriage, a radio receiver, and an actuator to operate a traveling transmission and steering wheels in response to signals of the receiver so that the working machine is operated when the signals are transmitted to said receiver by a radio transmitter, wherein a traveling brake and a traveling clutch are provided in a traveling control apparatus to function said traveling brake when said traveling clutch is in neutral, switches for operating said traveling clutch which are provided on said radio transmitter of said traveling control apparatus are independent switches for advancing and retreating operations, and said switches are located in a vicinity of a side surface to one side of a vertical center line of a front surface of said transmitter, and maintained at an appropriate distance such that they can not be easily operated simultaneously, said switches for said advancing and retreating operations occupying a position such that the advancing operation is easier to perform then the retreating operation, said switches being designed to transmit a clutch 'on' signal only when each of said switches is turned on by a finger of an operator.

2. A radio-control automotive working machine comprising a motor mounted on a carriage, a radio receiver, and an actuator to operate a traveling transmission and steering wheels in response to signals of the receiver so that the working machine is operated when the signals are transmitted to said receiver by a radio transmitter, wherein a traveling brake and a traveling clutch are provided in a traveling control apparatus to function said traveling brake when said traveling clutch is in neutral, said traveling clutch comprises a traveling clutch section, a clutch operating section and an actuator, and said traveling clutch section includes a clutch arm provided on a shifter shaft, while said clutch operating section includes independent clutch levers which have a movement locus at least partially superposed on a rotation locus of said clutch arm, said clutch levers and said clutch arm being elastic member interposed therebetween so that the clutch levers extend along said clutch arm, said actuator including two cams on a left and right having side slots opposite to each other so as to clamp an eccentric projection provided on an output shaft of said actuator, said cams and said clutch levers being connected by rods.

3. A radio control automotive working machine comprising a motor mounted on a carriage, a radio receiver and an actuator to operate a traveling transmission and steering wheels in response to signals of the receiver so that the working machine is operated when the signals are transmitted to said receiver by a radio transmitter, wherein a traveling brake and a traveling clutch are provided in a traveling control apparatus to function said traveling brake when said traveling clutch is in neutral, said traveling brake comprises a first brake clutch attached on a transmission shaft in a gear case so that said first brake clutch can slide on and transmit motive power to the transmission shaft, a second brake clutch which can mesh with said first brake clutch, and braking means for giving said second brake clutch a braking load with respect to the gear case.

4. A radio-control automotive working machine according to claim 3, wherein said braking means of the traveling brake comprise said second brake clutch having teeth to mesh with said first brake clutch which are formed on an end of the second brake clutch and a flange formed on another end, said second brake clutch being fitted around a drive shaft, an annular braking flange fitted around said second brake clutch and attached on the gear case of a traveling transmission at a position can be controlled, and a conical spring washer interposed between said second brake clutch and said braking flange.

* * * * *